United States Patent
Lo et al.

(10) Patent No.: US 8,026,498 B2
(45) Date of Patent: Sep. 27, 2011

(54) CALIBRATING APPARATUS, CALIBRATING METHOD AND MOVING METHOD FOR LENS CARRIER

(75) Inventors: Jih-Shun Lo, Hsin-Chu (TW); Tsair-Pay Yang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 355 days.

(21) Appl. No.: 12/430,884

(22) Filed: Apr. 27, 2009

(65) Prior Publication Data
US 2009/0310234 A1   Dec. 17, 2009

(30) Foreign Application Priority Data
Jun. 12, 2008   (TW) ................................ 97121994 A

(51) Int. Cl.
G02B 15/14   (2006.01)
(52) U.S. Cl. ..................................... 250/559.1; 359/704
(58) Field of Classification Search ............... 250/559.1; 359/698, 701, 894
See application file for complete search history.

(56) References Cited

U.S. PATENT DOCUMENTS

| | | | | |
|---|---|---|---|---|
| 4,199,240 A | * | 4/1980 | Norris | ............................... 396/37 |
| 4,700,338 A | * | 10/1987 | Sugihara et al. | ............... 720/623 |
| 6,043,877 A | * | 3/2000 | Land | ........................... 356/243.1 |
| 6,292,308 B1 | | 9/2001 | Tsuzuki et al. | |
| 7,280,196 B2 | * | 10/2007 | Hart et al. | ...................... 356/236 |

FOREIGN PATENT DOCUMENTS

| TW | 426812 | 3/2001 |
|---|---|---|
| TW | 519572 | 2/2003 |

* cited by examiner

Primary Examiner — Seung C Sohn
(74) Attorney, Agent, or Firm — Chun-Ming Shih

(57) ABSTRACT

A calibrating apparatus for lens carrier, includes a carrier, a driving unit, a first-dimension detector, and a control unit. The driving unit is capable of moving the carrier in a first-dimension direction. The first-dimension detector is capable of generating a corresponding first-dimension positional signal for the carrier according to a condition of whether detecting the carrier. The control unit is capable of receiving the first-dimension positional signal. The control unit determines whether the driving unit performing a first-predetermined driving operation based on the first-dimension positional signal for the carrier received when starting to calibrate. Finally, a position of the carrier in the first-dimension direction is adjusted based on the first-dimension positional signal for the carrier received after performing the first-predetermined driving operation.

19 Claims, 4 Drawing Sheets

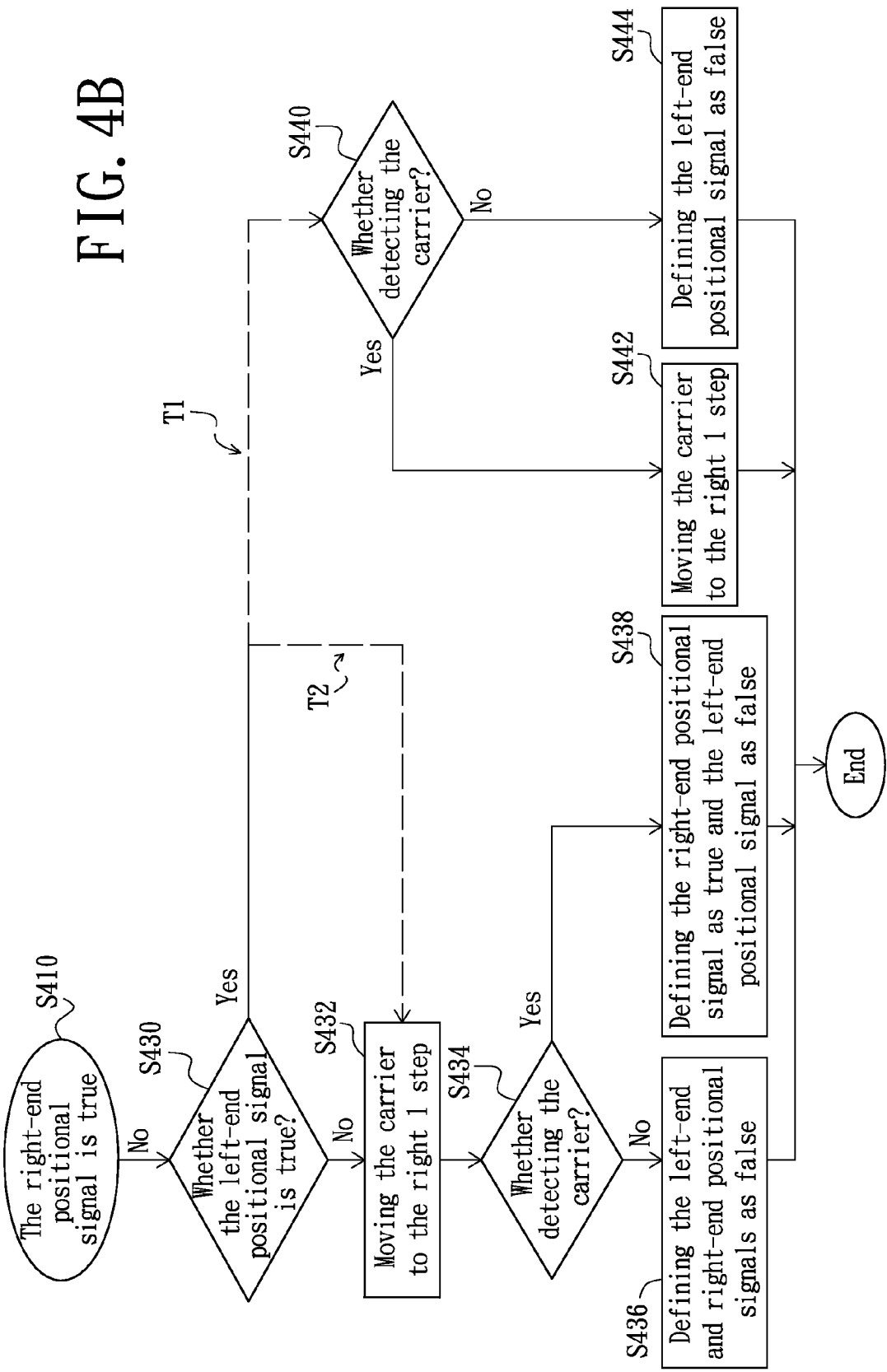

CALIBRATING APPARATUS, CALIBRATING METHOD AND MOVING METHOD FOR LENS CARRIER

CROSS-REFERENCE TO RELATED APPLICATIONS

This application is based upon and claims the benefit of priority from the prior Taiwanese Patent Application No. 097121994, filed Jun. 12, 2008, the entire contents of which are incorporated herein by reference.

BACKGROUND

1. Field of the Invention

The present invention relates to a calibrating apparatus, a calibrating method, and a moving method for lens carrier of an optical mechanism, and more particularly, to a calibrating apparatus, a calibrating method and a moving method for lens carrier to detect a fixed point to calibrate the position thereof in a dimension is adapted in an optical mechanism.

2. Description of the Related Art

In an optical mechanism system, the positions of lenses are very important. Since the positions of the lenses are directly related to the quality of images, a calibrating mechanism is employed in the optical mechanism to adjust the lenses to the suitable positions.

Referring to FIG. 1, a conventional calibrating apparatus for lens, is provided. Because the lens is apt to be abraded or polluted if adjusting directly the lens, the lens (not shown) is generally disposed on a carrier 10 such that the carrier 10 is adjusted to adjust the lens. The calibrating apparatus for lens includes a plurality of positing areas 120, 122, 124, and 126 defined around the periphery of the carrier 10, and a plurality of detectors 110, 112, 114, and 116 configured for detecting the positing areas 120, 122, 124, and 126 respectively to position the carrier 10 accurately.

The conventional calibrating apparatus for lens as shown in FIG. 1, employs two detectors to detect the position thereof in each one dimension, respectively. In other words, the lengths of the positing areas 120~126 and the positions of the detectors 110~116 are designed specially. The detectors 110 and 114 are configured for determining the horizontal-dimension (left and/or right) position of the carrier 10; and the detectors 112 and 116 are configured for determining the vertical-dimension (up and/or down) position of the carrier 10.

In operation, the carrier 10 is moved left and/or right to calibrate in the horizontal-dimension. The detectors 110, 114 and/or the positing areas 120, 124 are designed that the detectors 110 and 114 may detect the positing areas 120 and 124 respectively at the same time if the carrier 10 is in the suitable position. In the calibrating process, if the positing area 120 is detected and the positing area 124 is not detected, the judging result represents that the carrier 10 is positioned left (it may represent that the carrier 10 is positioned right with the different design). Contrarily, if the positing area 124 is detected and the positing area 120 is not detected, the judging result represents that the carrier 10 is positioned right (left). Similarly, the detectors 112, 116 and the positing areas 122, 126 are configured for adjusting the carrier 10 in the vertical-dimension.

In this condition, the (two) detectors may be cooperated to calibrate the carrier 10 in one dimension. In other words, the conventional calibrating apparatus may employ four detectors to calibrate the carrier 10 in two dimensions. However, in the condition that various apparatus are designed more and more compact, the amount of the detectors limits to reduce the size and the manufacturing cost of the optical mechanism.

What is needed is providing a calibrating apparatus, a calibrating method and a moving method for lens carrier, which may solve the above problems.

BRIEF SUMMARY

The embodiments of the invention are to provide a calibrating apparatus for lens carrier. The calibrating apparatus utilizes one detector to calibrate the lens carrier in one dimension such that the cost may be reduced and the calibrating apparatus may be more compact.

The embodiments of the invention are to further provide a calibrating method for lens carrier to achieve calibrating operation of the lens carrier in one dimension by using only one detector.

The embodiments of the invention are to still provide a moving method for lens carrier to move the lens carrier in one dimension in accordance to detecting results of one detector.

A calibrating apparatus for lens carrier in accordance with an exemplary embodiment of the invention is provided. The calibrating apparatus includes a carrier, a driving unit, a first-dimension detector, and a control unit. The driving unit is capable of moving the carrier in a first-dimension direction. The first-dimension detector is capable of generating a corresponding first-dimension positional signal for the carrier according to a condition of whether detecting the carrier. The control unit is electrically connected to the first-dimension detector, and the control unit is capable of receiving the first-dimension positional signal for the carrier. The control unit determines whether the driving unit performing a first-predetermined driving operation based on the first-dimension positional signal for the carrier received when starting to calibrate. In addition, a position of the carrier in the first-dimension direction is detected based on the first-dimension positional signal for the carrier received after performing the first-predetermined driving operation to generate a first judging result. The control unit is capable of adjusting the position of the carrier in the first-dimension direction based on the first judging result.

A calibrating method for lens carrier in accordance with an exemplary embodiment of the invention is provided. The calibrating method is adapted for adjusting a position of a carrier. The calibrating method includes: employing a first-dimension detector whether to detect the carrier to generate a corresponding first-dimension positional signal for the carrier; performing a first-predetermined driving operation if the first-dimension positional signal for the carrier represents that the first-dimension detector does not detect the carrier, wherein the first-predetermined driving operation is capable of moving the carrier to a first end in the first-dimension direction; and adjusting the carrier based on the first-dimension positional signal for the carrier generated after performing the first-predetermined driving operation.

A moving method for lens carrier in accordance with an exemplary embodiment of the invention is provided. The moving method is adapted for moving a carrier. The carrier is detected by a first-dimension detector, and the first-dimension detector is capable of generating a first-dimension positional signal for the carrier based on a condition of whether detecting the carrier. The moving method includes: judging whether receiving a command for moving the carrier in a first-dimension direction; driving the carrier based on a first-end positional signal if the received command represents moving the carrier to a first end in the first-dimension direction; and driving the carrier and defining the first-end positional signal and a second-end positional signal related to a second end if moving the carrier in the first-dimension direction. The first end and the second end are two ends of a moving range of the carrier being moved in the first-dimension direction.

The calibrating apparatus, the calibrating method, and the operation method in accordance with the exemplary embodiments of the invention, employ only one detector to calibrate the carrier. Therefore, the embodiments of the invention need only two detectors instead of four detectors in the conventional art to perform two-dimension calibration. Thus the embodiments of the invention may decrease the manufacturing cost and the space of the whole apparatus.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 4B is a flow chart of a moving method for lens carrier in accordance with other exemplary embodiment of the invention.

DETAILED DESCRIPTION

In the following detailed description of the preferred embodiments, reference is made to the accompanying drawings which form a part hereof, and in which is shown by way of illustration special embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
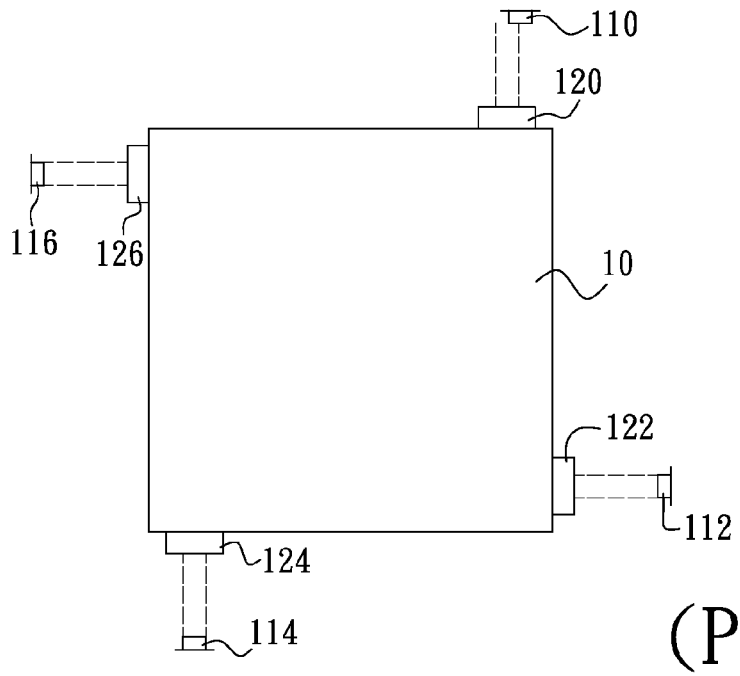
FIG. 1 is a schematic view of a conventional calibrating apparatus for lens carrier.
Figure 2A:
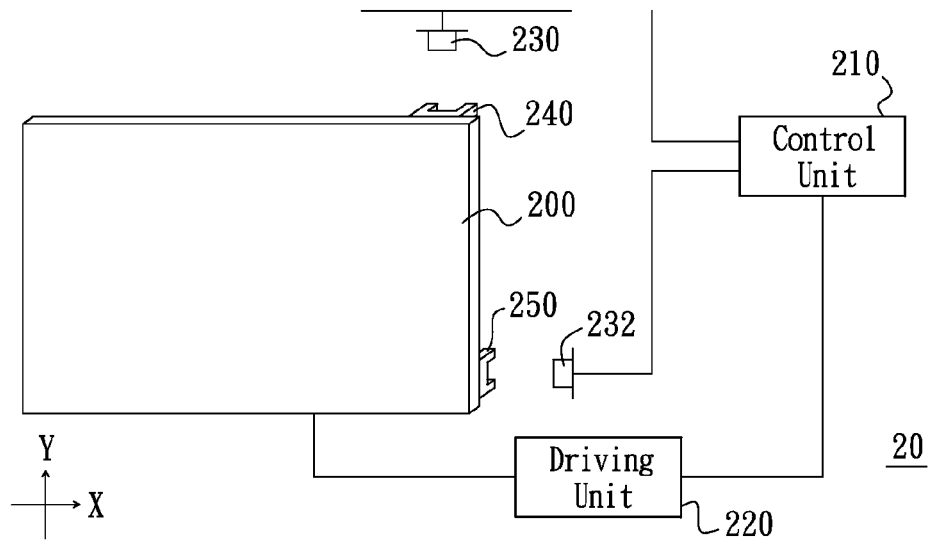
FIG. 2A is a schematic view of a calibrating apparatus for lens carrier in accordance with an exemplary embodiment of the invention.
Figure 2B:
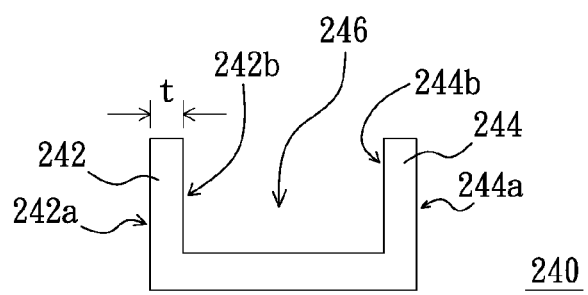
FIG. 2B is a schematic, structural view of a detected element of the calibrating apparatus for lens carrier in accordance with another exemplary embodiment of the invention.

Referring to FIG. 2A, a calibrating apparatus for lens carrier in accordance with an exemplary embodiment of the invention is provided. The calibrating apparatus 20 for lens carrier includes a carrier 200, a control unit 210, a driving unit 220, detectors 230, 232, and detected elements 240, 250. The detector 230 is capable of detecting the detected element 240 as shown in FIG. 2A to judge a position of the carrier 200 in the X-axis (called as the first-dimension in following) direction. The detector 232 is capable of detecting the detected element 250 as shown in FIG. 2A to judge a position of the carrier 200 in the Y-axis (called as the second-dimension) direction. Referring to FIG. 2B together, the detected element 240 of the calibrating apparatus for lens carrier in accordance with an exemplary embodiment of the invention is provided. In FIG. 2B, the detected element 240 is U-shaped, and has two sides 242 and 244. The two sides 242 and 244 have a thickness t respectively. The side 242 has an outer edge 242a and an inner edge 242b. The side 244 has an outer edge 244a and an inner edge 244b. A space area 246 is defined between the two inner edges 242b and 244b.

A moving range of the carrier 200 in the first-dimension direction is limited between the outer edges 242a and 244a, which may be detected by the detector 230. That is, if the carrier 200 is moved to the right end in the first-dimension direction, the detecting range of the detector 230 is between the outer edge 244a and the inner edge 244b. Similarly, if the carrier 200 is moved to the left end in the first-dimension direction, the detecting range of the detector 230 is between the outer edge 242a and the inner edge 242b. Furthermore, if the detecting range of the detector 230 is in the space area 246 wholly, the first-dimension positional signal for the carrier generated by the detector 230 is false. Contrarily, if part of the detecting range of the detector 230 is in the side 242 or 244 of the detected element 240, the first-dimension positional signal for the carrier generated by the detector 230 is true. Of course, an opposite design is suitable in the embodiment of the invention, and persons skilled in the art may devise variations in practice.

From the above, the control unit 210 is electrically connected to the detector 230 to judge the position of the carrier 200 by the first-dimension positional signal for the carrier received from the detector 230 cooperating with a designed judgment process, and to control the driving unit 220 for driving the carrier 200. The judgment process may be various, but the driving unit 220 is controlled to whether perform a first-predetermined driving operation based on the first-dimension positional signal for the carrier received when starting to calibrate. In the condition of performing the first-predetermined driving operation, the position of the carrier 200 in the first-dimension direction is judged according to the first-dimension positional signal for carrier received after performing the first-predetermined driving operation.

Figure 3:
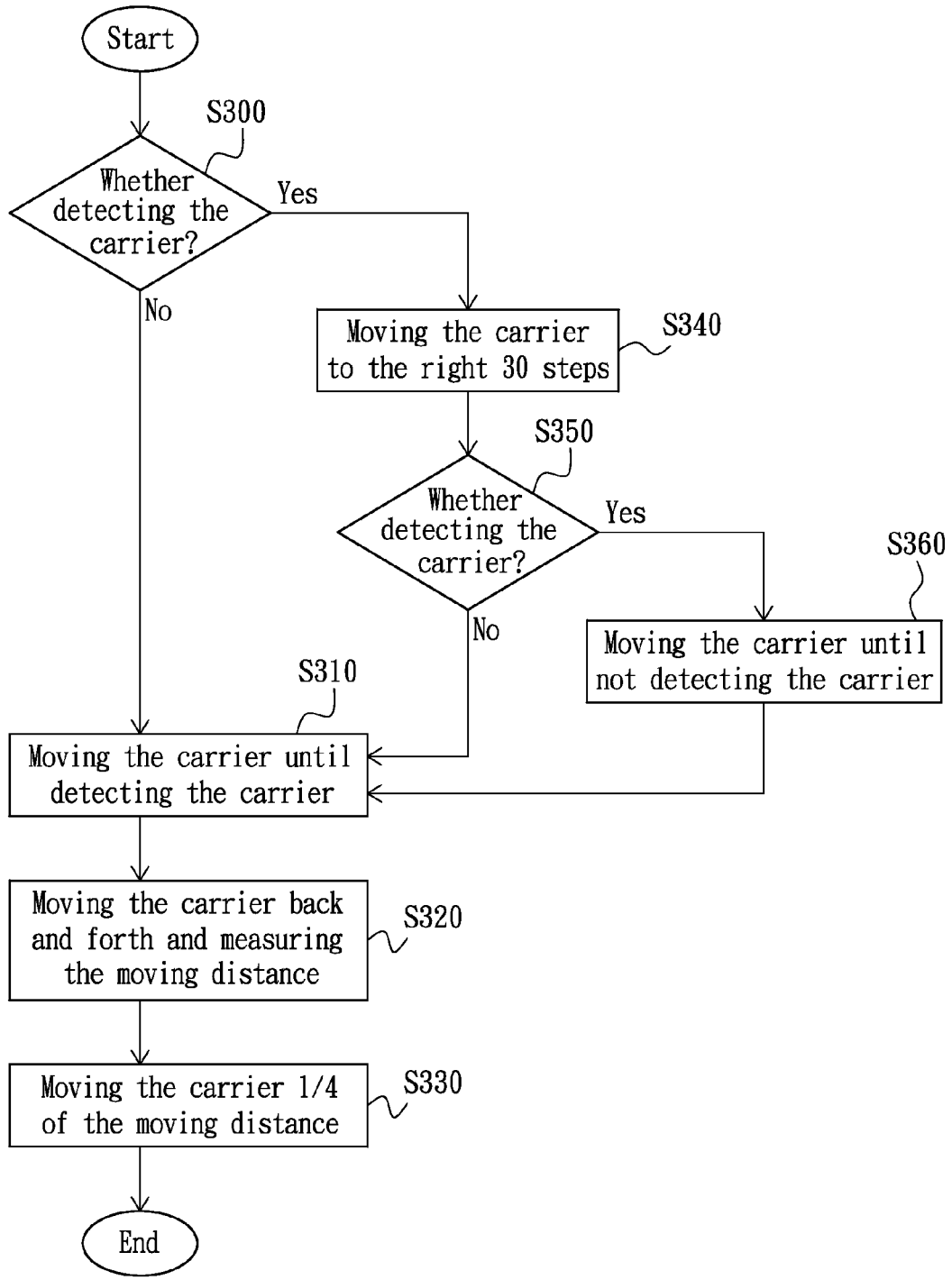
FIG. 3 is a flow chart of a calibrating method for lens carrier in accordance with other exemplary embodiment of the invention.

Referring to FIG. 3, a flow chart of the calibrating method for lens carrier adapted to the control unit in accordance with an exemplary embodiment of the invention is provided. In this exemplary embodiment, firstly the first-dimension positional signal for the carrier is employed to judge whether detecting the carrier 200 (step S300). If not detecting the carrier 200, the judging result represents that the carrier 200 is positioned between the ends of the moving range in the first-dimension direction (such as between the left end and the right end). At this time, the carrier 200 is moved to be detected. In other words, the carrier 200 is moved until the first-dimension positional signal for the carrier changes (step S310).

After the step S310, step S320 is moving the carrier 200 back and forth once between the two ends in the first-dimension direction. This step is performed by judging the amount of changing the first-dimension positional signal for the carrier. For example, if the carrier 200 is moved to the left until the detector 230 detects the carrier 200 in the step 310, the first-dimension positional signal for the carrier is true. In this condition, the carrier 200 is moved to the right in the step 320 until the first-dimension positional signal for the carrier changes to be false from true (the whole detecting range being in the space area 246 as shown in FIG. 2B) and then to be true from false (the detecting range being in the side 244 as shown in the FIG. 2B). Thus the motion from left to right finishes. Similarly, the motion from right to left is performed by the similar mode. Furthermore, the moving distance of the carrier 200 in the step 320 is measured for following steps, wherein the moving distance may be measured by counting the step number of the motor or others.

After finishing the step S320, the moving distance of the carrier 200 moving back and forth once in the first-dimension direction is obtained. The moving distance is four times that between the end and a calibrating zero, wherein the calibrating zero is a dot between the left end and the right end. Therefore, in the step S330, the carrier 200 is moved a distance ¼ time of the moving distance measured in the step S320, such that the carrier 200 is moved at the calibrating zero in the first-dimension direction.

Of course, the calibrating zero may be ascertained not by moving the carrier 200 back and forth once. In fact, the moving distance of moving the carrier 200 to another end once is two times the distance between the calibrating zero and one end in this dimension direction (here is the X axis direction). Thus, the carrier 200 may perform a whole single motion (from the right end to the left end, or from the left end to the right end) any times to ascertain the calibrating zero.

In addition, if the carrier 200 is detected in the step S300, the carrier 200 needs to be moved a predetermined distance to the right end (or the left end) to judge whether the carrier 200 is positioned at the left end or the right end. That is the first-predetermined operation (step S340). The moving distance in the first-predetermined operation may be any values. Preferably, the moving distance is larger than the thickness (the thickness t as shown in FIG. 2B) of the side of the detected element, and less than a half of the largest moving distance. For example, this exemplary embodiment moves the carrier 200 30 steps (the motor rotates 30 steps) to the right. After the first-predetermined operation, step S350 is performed to judge whether detecting the carrier 200 again. If the carrier 200 is detected in the step 350, the judging result represents the carrier 200 is positioned at the right end. Contrarily, if the carrier 200 is not detected in the step S350, the judging result represents that the carrier 200 is originally positioned at the left end and enters the area between the left end and the right end after the first-predetermined operation.

After the step S350, the judging result is stored for other processing programs (FIG. 3 not shows the storing step). For example, if judging the carrier 200 at the right end currently, a right-end positional signal related to the right end is true; if judging the carrier 200 not at the right end currently, the right-end positional signal is false. Similarly, a left-end positional signal related to the left end is defined by the above mode.

If the thickness t of the detected element 240 is not considered (is ignored), the judging result in the step S350 is not considered and the step S310 is directly performed. If the thickness t of the detected element 240 is considered (is not ignored) and the carrier 200 is detected in the step S350, the judging result represents that the detector 230 may be positioned about the outer edge of the right side of the detected element 240 (the outer edge 244a as shown in FIG. 2B). Therefore, the carrier 200 is moved to the left until the detector 230 does not detect the carrier 200 (step S360) to confirm following steps performed in the two inner edges of the detected element 240 (the inner edges 242b and 244b as shown in FIG. 2B), such that the calibrating zero is ascertained accurately.

Figure 4A:
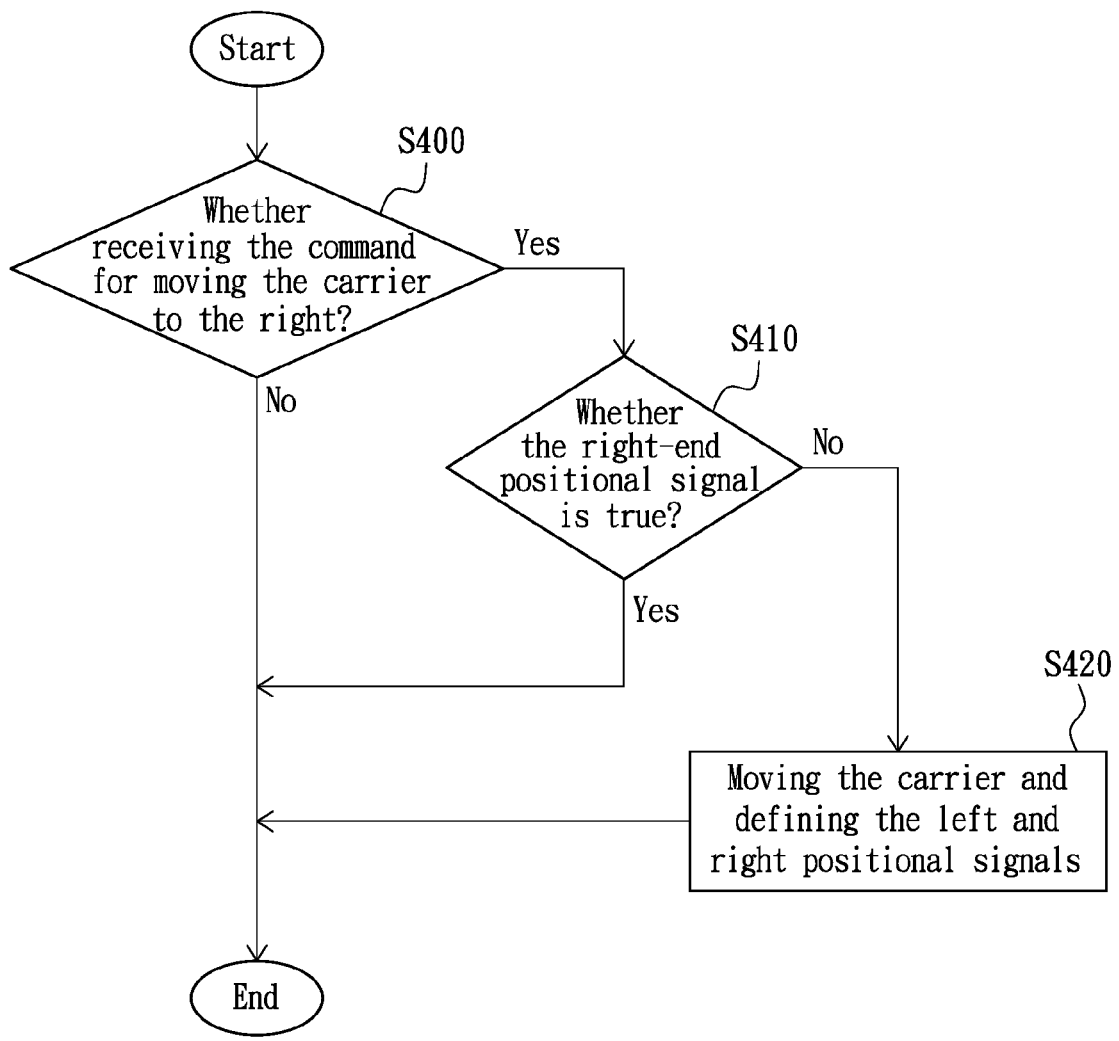
FIG. 4A is a flow chart of a moving method for lens carrier in accordance with other exemplary embodiment of the invention.

Referring to FIG. 4A, a flow chart of a moving method for lens carrier in accordance with an exemplary embodiment of the invention is provided. In this exemplary embodiment, the left-end positional signal and the right-end positional signal may be values obtained in the above steps or predetermined.

In this exemplary embodiment, firstly step S400 is performed to judge whether receiving a command of moving the carrier 200 to one end (to the right in this exemplary embodiment) in the first-dimension direction. Assuming not receiving the command, the related operations finish. Contrarily, if receiving the command, step S410 is performed to judge whether the positional signal of the moving object (the right-end positional signal in this exemplary embodiment) is true. If the positional signal of the moving object is true in the step S410, the judging result represents that the carrier 200 is positioned at the end in the moving direction, and the carrier 200 needs not to be moved. Contrarily, if the positional signal of the moving object is false in the step S410, the judging result represents that there is moving space to move the carrier 200 and the step S420 is performed to move the carrier 200 and define the values of the left and right-end positional signals.

An exemplary embodiment of the step S420 is shown in FIG. 4B. In FIG. 4B, if the judging result in the step S410 is false, step S430 is performed to judge whether the left-end positional signal is true. If the left-end positional signal is not true, the judging result represents that the carrier 200 is not positioned at the left end and the right end. Thus the carrier 200 is moved a step to the right in step S432. After moving, step S434 is performed to judge whether detecting the carrier 200. If detecting the carrier 200 in the step S434, the judging result represents that the carrier 200 is moved to the right end, and the right-end positional signal is defined true and the left-end positional signal keeps being false (step S438). Contrarily, if not detecting the carrier 200 in the step S434, the judging result represents that the carrier 200 is between the left end and the right end, and the left and right-end positional signals keep being false (step S436).

If the left-end positional signal is true in the step S430, the judging result represents that the carrier 200 is at the left end. At this time, if not considering the thickness t of the detected element 240 on the carrier 200, the process is guided to perform the step S432 through a route T2, to move the carrier 200 to the right and define the corresponding positional signal. Contrarily, if considering the thickness t of the detected element 240 on the carrier 200, the process is guided to perform the step S440 through the route T1, to judge whether detecting the carrier 200 at firstly. If detecting the carrier 200, the carrier 200 is moved a step to the right (step S442). The step S442 may not convert the first-dimension positional signal for the carrier from true to false because of the thickness t of the detected element 240. Therefore the positional signals do not change after this step. Contrarily, if not detecting the carrier 200 in the step S440, the judging result represents the detecting range of the detector 230 has left from the left side of the detected element 240 in the above moving operations (such as the step S442). Therefore, the left-end positional signal is defined false (step S444), and the carrier 200 is moved at this time (not shown) or in the following steps (for example, inputting the command for moving to right once again).

It should be noted that the above exemplary embodiments define the direction for moving left and right as the first-dimension direction and the direction for moving up and down as the second-dimension direction. However, the definition is just one of various designs. Alternatively, the first-dimension direction may be the direction for moving up and down, or front and back, or left and right, and the second-dimension direction may be other directions. In addition, the above embodiments employ adjusting the left and right position as exemplary embodiments. However, adjusting the position in other directions may be obtained by amending the above exemplary embodiments. For example, to the right of the above exemplary embodiments may be amended to up, and to the left may be amended to down, such that the process may be amended to be the operation method for adjusting up and down. Variations may be made within the scope and spirit of the disclosure, and are not disclosed in following.

From the above, the calibrating apparatus, the calibrating method, and the operation method in accordance with the exemplary embodiments of the invention employ only one detector to calibrate the carrier. Therefore, the embodiments of the invention need only two detectors instead of four detectors in the conventional art to perform two-dimension calibration. Thus the embodiments of the invention may decrease the manufacturing cost and the space of the whole apparatus.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A calibrating apparatus for lens carrier, comprising:
   a carrier;
   a driving unit capable of moving the carrier in a first-dimension direction;
   a first-dimension detector capable of generating a corresponding first-dimension positional signal for the carrier according to a condition of whether detecting the carrier; and
   a control unit electrically connected to the first-dimension detector, and capable of receiving the first-dimension positional signal for the carrier;
   wherein the control unit determines whether the driving unit performing a first-predetermined driving operation based on the first-dimension positional signal for the carrier received when starting to calibrate, if performing the first-predetermined driving operation, a position of the carrier in the first-dimension direction is detected based on the first-dimension positional signal for the carrier received after performing the first-predetermined driving operation to generate a first judging result, and the control unit is capable of adjusting the position of the carrier in the first-dimension direction based on the first judging result.

2. The calibrating apparatus as claimed in claim 1, further comprising:
   a second-dimension detector capable of generating a corresponding second-dimension positional signal for the carrier according to a condition of whether detecting the carrier.

3. The calibrating apparatus as claimed in claim 2, wherein the control unit further determines whether the driving unit performing a second-predetermined driving operation based on the second-dimension positional signal for the carrier received when starting to calibrate, if performing the second-predetermined driving operation, a position of the carrier in the second-dimension direction is detected based on the second-dimension positional signal for the carrier received after performing the second-predetermined driving operation to generate a second judging result, the control unit is capable of adjusting the position of the carrier in the second-dimension direction based on the second judging result, and a predetermined angle is defined between the first-dimension direction and the second-dimension direction.

4. The calibrating apparatus as claimed in claim 2, wherein the carrier comprises a U-shaped structure having two sides, and whether the second-dimension detector detecting one of the two sides of the U-shaped structure is used as a base for whether the second-dimension detector detecting the carrier.

5. The calibrating apparatus as claimed in claim 1, wherein the carrier comprises a U-shaped structure having two sides, and whether the first-dimension detector detecting one of the two sides of the U-shaped structure is used as a base for whether first-dimension detector detecting the carrier.

6. A calibrating method for lens carrier, the calibrating method being adapted for adjusting a position of a carrier, and the calibrating method comprising:

employing a first-dimension detector whether to detect the carrier to generate a corresponding first-dimension positional signal for the carrier;

performing a first-predetermined driving operation if the first-dimension positional signal for the carrier represents that the first-dimension detector does not detect the carrier, wherein the first-predetermined driving operation is capable of moving the carrier to a first end in the first-dimension direction; and adjusting the carrier based on the first-dimension positional signal for the carrier generated after performing the first-predetermined driving operation.

7. The calibrating method as claimed in claim 6, further comprising:

employing a second-dimension detector whether to detect the carrier to generate a corresponding second-dimension positional signal for the carrier;

performing a second-predetermined driving operation if the second-dimension positional signal for the carrier represents that the second-dimension detector does not detect the carrier, wherein the second-predetermined driving operation is capable of moving the carrier to a second end in a second-dimension direction; and adjusting the carrier based on the second-dimension positional signal for the carrier generated after performing the second-predetermined driving operation.

8. The calibrating method as claimed in claim 6, wherein the step of adjusting the carrier based on the first-dimension positional signal for the carrier generated after performing the first-predetermined driving operation, comprises:

moving the carrier in the first-dimension direction until the first-dimension positional signal for the carrier represents that the first-dimension detector detects the carrier, if the first-dimension positional signal for the carrier generated after performing the first-predetermined driving operation represents that the first-dimension detector does not detect the carrier; and moving the carrier to a calibrating zero, the step of moving the carrier to the calibrating zero comprises:

driving the carrier to move the carrier back and forth once in the first-dimension direction;

measuring a moving distance of moving the carrier back and forth once in the first-dimension direction;

dividing the moving distance by four to obtain a distance between the first end and the calibrating zero; and driving the carrier based on the distance between the first end and the calibrating zero to move the carrier to the calibrating zero from the first end.

9. The calibrating method as claimed in claim 8, wherein the predetermined distance is larger than the thickness of a detected object of the carrier.

10. The calibrating method as claimed in claim 8, further comprising following steps before moving the carrier to the calibrating zero, if the first-dimension positional signal for the carrier generated after performing the first-predetermined driving operation represents that the first-dimension detector detects the carrier, the following steps comprising:

moving the carrier in the first-dimension direction and far away from the first end, until the first-dimension positional signal for the carrier represents that the first-dimension detector does not detect the carrier; and moving the carrier to the first end in the first-dimension direction, until the first-dimension positional signal for the carrier represents that the first-dimension detector detects the carrier.

11. The calibrating method as claimed in claim 6, further comprising:

defining a first-end positional signal as true if the first-dimension positional signal for the carrier generated after performing the first-predetermined driving operation represents that the first-dimension detector detects the carrier; and defining the first-end positional signal as false and defining a second-end positional signal related to a second end as false if the first-dimension positional signal for the carrier generated after the first-predetermined driving operation represents that the first-dimension detector does not detect the carrier, wherein the second end is opposite to the first end and in the first-dimension direction.

12. The calibrating method as claimed in claim 11, further comprising:

judging whether receiving a command for moving the carrier in the first-dimension direction;

driving the carrier based on the first-end positional signal, if the received command represents moving the carrier to the first end in the first-dimension direction; and driving the carrier and defining the first-end positional signal and the second-end positional signal if moving the carrier in the first-dimension direction.

13. The calibrating method as claimed in claim 12, wherein the step of driving the carrier based on the first-end positional signal, comprises:

not driving the carrier if the first-end positional signal is true; and moving the carrier to the first end a distance with a unit in the first-dimension direction, if the first-end positional signal is false.

14. The calibrating method as claimed in claim 12, wherein the step of driving the carrier and defining the first-end positional signal and the second-end positional signal, comprises:

performing following steps if not considering the thickness of the detected object of the carrier detected by the first-dimension detector, the following steps comprising:

after receiving the command to drive the carrier, defining the first-end positional signal as true and defining the second-end positional signal as false if the first-dimension positional signal for the carrier represents that the first-dimension detector detects the carrier; and after receiving the command to drive the carrier, defining the first-end positional signal and the second-end positional signal as false if the first-dimension positional signal represents that the first-dimension detector does not detect the carrier.

15. The calibrating method as claimed in claim 12, wherein the step of driving the carrier and defining the first-end positional signal and the second-end positional signal, comprises:

performing following steps if considering the thickness of the detected object of the carrier detected by the first-dimension detector, the following steps comprising:

judging whether the second-end positional signal being true;

if the second-end positional signal is true, performing following steps:

moving the carrier to the first end a distance with a unit in the first-dimension direction if the first-dimension positional signal for the carrier represents that the first-dimension detector detects the carrier; and defining the second-end positional signal as false if the first-dimension positional signal for the carrier represents that the first-dimension detector does not detect the carrier; and if the second-end positional signal is false, performing following steps:

moving the carrier to the first end a distance with a unit in the first-dimension direction;

after receiving the command to drive the carrier, defining the first-end positional signal as true and defining the second-end positional signal as false if the first-dimension positional signal for the carrier represents that the first-dimension detector detects the carrier; and after receiving the command to drive the carrier, defining the first-end positional signal and the second-end positional signal as false if the first-dimension positional signal for the carrier represents that the first-dimension detector does not detect the carrier.

16. A moving method for lens carrier, the method being adapted for moving a carrier, the carrier being detected by a first-dimension detector, and the first-dimension detector being capable of generating a first-dimension positional signal for the carrier based on a condition of whether detecting the carrier, the moving method comprising:

judging whether receiving a command for moving the carrier in a first-dimension direction;

driving the carrier based on a first-end positional signal if the received command represents moving the carrier to a first end in the first-dimension direction; and driving the carrier and defining the first-end positional signal and a second-end positional signal related to a second end if moving the carrier in the first-dimension direction, wherein the first end and the second end are two ends of a moving range of the carrier being moved in the first-dimension direction.

17. The moving method as claimed in claim 16, wherein the step of driving the carrier based on the first-end positional signal, comprises:

not driving the carrier if the first-end positional signal is true; and moving the carrier to the first end a distance with an unit in the first-dimension direction if the first-end positional signal is false.

18. The moving method as claimed in claim 16, wherein the step of driving the carrier and defining the first-end positional signal and the second-end positional signal, comprises:

performing following steps if not considering the thickness of a detected object of the carrier detected by the first-dimension detector, the following steps comprising:

after receiving the command to drive the carrier, defining the first-end positional signal as true and defining the second-end positional signal as false if the first-dimension positional signal for the carrier represents that the first-dimension detector detects the carrier; and after receiving the command to drive the carrier, defining the first-end positional signal and the second-end positional signal as false if the first-dimension positional signal for the carrier represents the first-dimension detector does not detect the carrier.

19. The moving method as claimed in claim 16, wherein the step of driving the carrier and defining the first-end positional signal and the second-end positional signal, comprises:

performing following steps if considering the thickness of a detected object of the carrier detected by the first-dimension detector, the following steps comprising:

judging whether the second-end positional signal being true;

if the second-end positional signal is true, performing following steps:

moving the carrier to the first end a distance with an unit in the first-dimension direction if the first-dimension positional signal for the carrier represents that the first-dimension detector detects the carrier; and defining the second-end positional signal as false if the first-dimension positional signal for the carrier represents that the first-dimension detector does not detect the carrier; and if the second-end positional signal is false, performing following steps:

moving the carrier to the first end a distance with an unit in the first-dimension direction;

after receiving the command to drive the carrier, defining the first-end positional signal as true and defining the second-end positional signal as false if the first-dimension positional signal for the carrier represents that the first-dimension detector detects the carrier; and after receiving the command to drive the carrier, defining the first-end positional signal and the second-end positional signal as true if the first-dimension positional signal for the carrier represents that the first-dimensional detector does not detect the carrier.

* * * * *